Feb. 9, 1965      H. W. DIETERT      3,169,108

MECHANICAL VIBRATOR FOR MOLDABILITY CONTROLLER

Filed Aug. 21, 1961

INVENTOR.
HARRY W. DIETERT
BY Whittemore
Hulbert & Belknap
ATTORNEYS

United States Patent Office 3,169,108
Patented Feb. 9, 1965

3,169,108
MECHANICAL VIBRATOR FOR MOLDABILITY
CONTROLLER
Harry W. Dietert, Kerrville, Tex., assignor to Harry W.
Dietert Co., Detroit, Mich., a corporation of Michigan
Filed Aug. 21, 1961, Ser. No. 132,903
3 Claims. (Cl. 209—275)

The invention relates to material conditioning apparatus and refers more specifically to an adjustable mechanical vibrator for use in a foundry sand moldability controller or similar structure.

Directly controlling an ultimate property of granular material, such as the moldability of foundry sand, rather than attempting the control of the ultimate property by controlling the addition of a constituent of the granular material, such as the water content thereof is desirable in that a more accurate and reliable control of the ultimate property may be obtained.

Apparatus for effecting the direct control of the moldability of foundry sand is known. In the past granular material has been separated in such apparatus in accordance with the moldability thereof by means of screens or riddles which have been electrically vibrated in a manner to advance the granular material thereover. Electrical vibrating means for such apparatus is relatively complicated and expensive to purchase, maintain and operate.

Further prior vibrator apparatus has not provided a sufficient range of vibrator motion adjustment to vary the passage of the granular material over the vibrated screen or riddle sufficiently to permit control of the moldability of granular material over a desired range of moldability values.

It is therefore one of the objects of the present invention to provide mechanical vibrating apparatus for use in moldability controllers or similar structures.

Another object is to provide a mechanical vibrator for use in a moldability controller including means for adjusting the motion of the vibrator over a wide range.

Another object is to provide mechanical vibrating apparatus including resiliently supported separating means, vibrator arms pivotally secured at one end to the separating means and at the other end to a fixed support, a counter-shaft rotatably mounted on the vibrator arm having a weight eccentrically secured thereto and means for rotating the counter-shaft.

Another object is to provide mechanical vibrating apparatus as set forth above wherein the fixed support is an arcuate member and the other end of the vibrator arm may be pivotally secured thereto at a plurality of predetermined points therealong to vary the motion imparted to the separating means on rotation of the counter-shaft.

Another object is to provide a moldability controller including means for mixing granular material and an additive, means for metering an additive to the granular material, separating means for separating a sample of the granular material into separate portions according to the moldability thereof including mechanical vibrating apparatus and means for controlling the metering of the additive to the granular material in accordance with the relative weight of the separate portions of the sample of granular material.

Another object is to provide mechanical vibrating apparatus which is simple in construction, economical to manufacture and efficient in use.

Other objects and features of the invention will become apparent as the description proceeds, especially when taken in conjunction with the accompanying drawing, illustrating a preferred embodiment of the invention, wherein.

Figure 1:
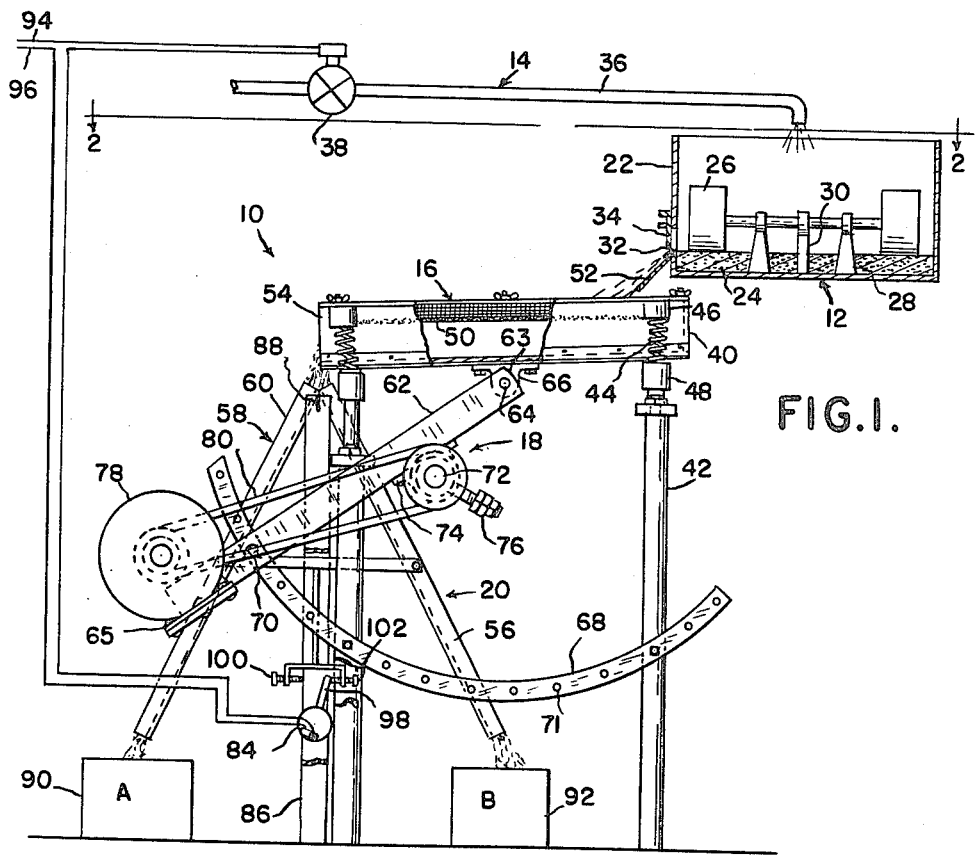
FIGURE 1 is an elevation view of a moldability controller including mechanical vibrating apparatus constructed in accordance with the invention.
Figure 2:
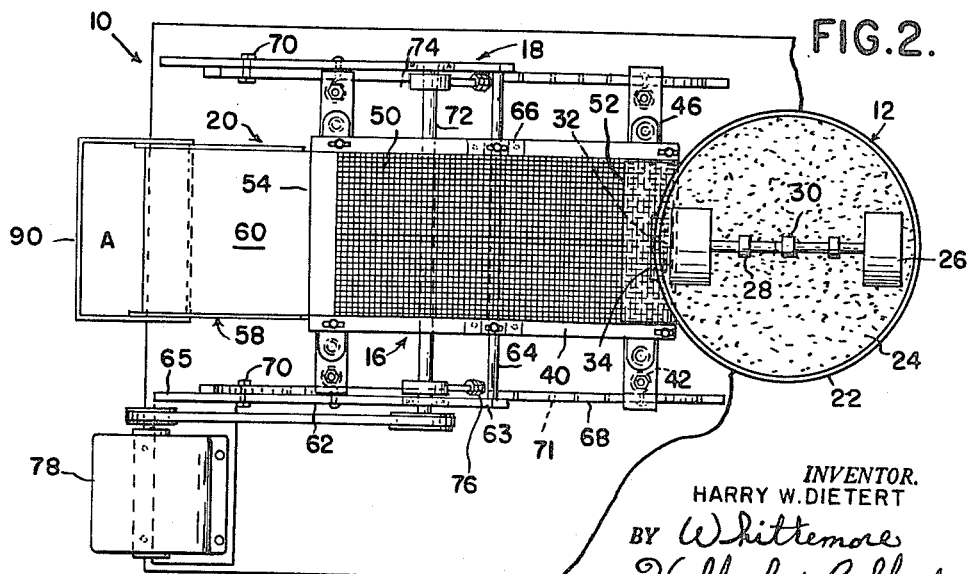
FIGURE 2 is a view of the moldability controller apparatus illustrated in FIGURE 1 taken substantially on the line 2—2 in FIGURE 1.

With particular reference to the figures of the drawing, one embodiment of the present invention will now be disclosed.

The moldability controller 10 illustrated in FIGURE 1 includes a muller 12, additive supply apparatus 14, separating means 16 and the mechanical vibrating apparatus 18. The means 20 for controlling the addition of additive to the granular material in the muller 12 in accordance with the moldability of the granular material therein is also part of the moldability controller 10.

In operation granular material and additive are mixed in the muller 12 and a sample thereof continuously fed to the separator 16. Separator 16 under the influence of mechanical vibrating apparatus 18 separates the sample of granular material into two portions A and B having a relative weight dependent on the moldability of the granular material and additive sample. The portions of granular material A and B may periodically be weighed and calculations made to determine the moldability of the granular material in muller 12.

Alternatively the separated portions of the granular material are utilized directly to halt the addition of additive to the muller 12 when the granular material in the muller 12 reaches a predetermined moldability.

More specifically the muller 12 includes the cylindrical container 22 into which the granular material 24 and an additive, such as water from the additive supply apparatus 14 are positioned for mixing to condition the granular material. The rollers 26 and scrapers 28 are mounted in the container 22 on the rotatable shaft 30, as shown best in FIGURE 1, and serve to mix the additive and granular material.

An opening 32 is provided in the side of the container 22 near the bottom thereof through which a substantially continuous sample of granular material from the container 22 is passed due to the action of the rollers and scrapers on rotation thereof. The sliding gate 34 permits metering of the quantity of granular material sample passed to the separating apparatus.

The additive supply apparatus 14 includes the pipe 36 through which the additive is passed to container 22 and a supply reservoir for the additive (not shown). A solenoid actuated valve 38 is positioned in the pipe 36 which is operable on actuation to control the flow of additive through pipe 36 to the container 22.

The separating apparatus 16 includes a U-shaped trough member 40 resiliently supported on the vertical posts 42 by means of the spring 44 secured in the blocks 46 and 48 which are fastened to the trough 40 and posts 42, respectively. The separating means 16 also includes the U-shaped screen or riddle 50 supported by the trough 40.

In operation the sample of granular material from the opening 32 in the container 22 is fed onto the screen 50 of separating means 16 from the chute 52 and is advanced toward the end 54 of the separating means 16 by means of a reciprocating motion imparted to the separating means 16 by the mechanical vibrating apparatus 18.

The separating apparatus is so constructed that at the end 54 the trough 40 is set back from the screen 50 whereby granular material having passed through the screen 50 during traverse of the sample of granular material over the screen 50 to the end 54 of the separating apparatus will fall onto side 56 of the balance 58, of the means 20 for controlling the addition of additive to the container 22, while the material remaining on the screen 50 at the end 54 of the separating means 16 will fall on the side 60 of the balance 58.

The mechanical vibrating apparatus for producing movement of the granular material over the separating apparatus 16 toward the end 54 thereof includes a vibrator arm 62 pivotally secured at end 63 to shaft 64 at each side of the trough 40. The shaft 64 is mounted in the bearings 66 supported on the trough 40. The vibrator arms 62 are pivotally secured at their ends 65 in adjustable fixed positions along the arcuate members 68 secured to the posts 42 on opposite sides of the separating apparatus 16. Adjustment of the ends 65 of vibrator arms 62 along the arcuate member 68 is accomplished by means of removable pivot pins 70 extending through openings 71 in both the arms 62 and the members 68 in assembly.

Countershaft 72 is rotatably secured to vibrator arms 62 by bearings 74 as shown best in FIGURE 1. Adjustable weights 76 are secured to the counter-shaft 72 for adjustment radially with respect thereto. Counter-shaft 72 is rotated by means of the motor 78 and the drive belt 80. Motor 78 is mounted on the end 65 of one of the arms 62 as shown best in FIGURE 1.

In operation as the counter-shaft 72 is rotated due to running of the motor 78 the weights 76 eccentrically mounted thereon cause pivoting of the vibrator arms 62 about the pivot pins 70 to impart a reciprocating arcuate motion to the separator 16, thus moving the granular material deposited thereon toward the end 54 thereof. The magnitude of the reciprocal motion is determined by the adjustable eccentricity of the weights 76.

The arcuate path of the reciprocal motion is determined by the adjustable setting of the pivot pins 70. Thus if the ends 65 of the vibrator arms 62 are moved upward along the arcuate member 68 the reciprocal motion imparted to granular material deposited on the separating apparatus 16 will be more vertical rather than horizontal. Conversely if the ends 65 of the vibrator arms 62 are moved down and to the right on the arcuate member 68 the motion imparted to the granular material deposited on the separating apparatus 16 will be more horizontal and less vertical so that the speed at which the sample of granular material traverses the separating apparatus 16 will be increased. Thus the moldability of the granular material 24 may be variably controlled by adjusting the position of the pivotal connection of the ends 65 of the vibrator arms 62 to the arcuate members 68.

The means 20 for controlling the addition of additive to the container 22 in accordance with the moldability of the sample of granular material passed over separating apparatus 16 includes the balance 58, the mercury switch 84 and the solenoid actuated valve 38 in the additive supply apparatus 14 as shown in FIGURE 1. The balance 58 is pivotally supported on the vertical posts 86 by convenient means such as a frictionless resilient band 88 beneath the end 54 of the separating apparatus 16. As shown the balance 58 is so positioned that granular material from the screen 50 of the separating apparatus 16 always falls on the side 60 thereof and granular material falling through the screen 50 onto the bottom of the trough 40 will fall on the side 56 thereof on vibration of the separating apparatus 16.

The granular material thus is deposited in the containers 90 and 92 in different proportions in accordance with the moldability of the sample of granular material traversing the separating apparatus 16. The granular material in the containers 90 and 92 may then be weighed and calculations made to determine the moldability of the granular material in accordance with the following formulae wherein B is the weight of the granular material sample passing through the screen 50 and A is the weight of material not passing through the plate as more fully set forth in the commonly owned copending patent application Serial No. 83,074, filed January 16, 1961.

$$\text{Moldability} = \frac{B}{A+B} \cdot 100$$

$$\text{Toughness} = \frac{A}{A+B} \cdot 100$$

The mercury switch 84 is provided to complete an electric circuit over conductors 94 and 96 to the solenoid operated valve 38 on rotation thereof. The mercury switch 84 is rotatably mounted adjacent the balance 58 and is actuated on rotation of the balance due to the switch lever 98 coming in contact with the adjustable stop 100 or 102 carried by the balance 58.

Thus in operation when the balance moves to a predetermined position due to a particular division of the sample of granular material fed to separating apparatus 16 which indicates a particular moldability of the granular material in the container 22, the mercury switch 84 is actuated to energize the solenoid actuated valve 38 and automatically stop the addition of additive to the container 22 through the pipe 36.

The drawings and the foregoing specification constitute a description of the improved mechanical vibrator in such full, clear, concise and exact terms as to enable any person skilled in the art to practice the invention, the scope of which is indicated by the appended claims.

What I claim as my invention is:

1. A mechanical vibrator comprising four substantially parallel spaced apart posts located to form a rectangle therebetween, resilient means connected to the top of each of said posts, a member to be vibrated secured to the resilient means whereby the member to be vibrated is resiliently supported on said posts, a pair of elongated arcuate members each secured to a separate pair of posts and extending longitudinally of the rectangle formed thereby, each of said arcuate members having a plurality of spaced apart transversely aligned openings extending therethrough, a vibrator arm on each side of said member to be vibrated pivotally secured thereto at one end, means for pivotally securing the vibrator arms to the elongated arcuate members at different locations therealong longitudinally thereof in alignment with each other which locations are defined by the transverse openings in the elongated arcuate members, a counter-shaft, means for rotatably securing said counter-shaft to said vibrator arms adjacent said one end thereof, an eccentric weight secured to said counter-shaft at the opposite ends thereof and means supported at the other end of one of said vibrator arms for rotating said counter-shaft.

2. A mechanical vibrator adapted to be used in a moldability controller comprising four substantially parallel spaced apart posts located to form a rectangle therebetween, one set of two adjacent posts being shorter than the other set of two adjacent posts, each post of each set of posts being substantially the same height, resilient means connected to the top of each of said posts, a substantially U-shaped trough having a screen over the open upper side thereof and extending longitudinally between the longer and shorter sets of posts connected to the resilient means for vibration thereon, a pair of elongated arcuate members extending longitudinally of said trough and secured at opposite sides of the trough to the longer and shorter posts on the respective sides of the trough, each of said arcuate members having a plurality of longitudinally spaced apart transversely aligned openings extending therethrough, a pivot mounting bearing secured to said trough at the center of curvature of said arcuate member on each side of said trough, an elongated vibrator arm on each side of said trough and pivotally secured to the pivot mounting bearing at one end, means for pivotally securing the vibrator arms adjacent the other end to the elongated arcuate members at different locations therealong longitudinally thereof and in transverse alignment with each other, said locations being defined by the transverse openings in the elongated arcuate members, a countershaft extending transversely of said trough, means for rotatably securing said countershaft to said vibrator arms adjacent said one end thereof, an eccentric weight secured to said countershaft for rotation therewith, motor means secured to at least one of the vibrator arms at the other end thereof and endless linear means extending between said motor means and countershaft for rotating said countershaft on actuation of said motor means.

3. Structure as set forth in claim 2 wherein said eccentric weight comprises a radially extending threaded rod on said countershaft and weights adjustably positioned on said threaded shaft for radial movement relative to said countershaft.

References Cited by the Examiner

UNITED STATES PATENTS

| | | | |
|---|---|---|---|
| 236,697 | 1/81 | Behr | 209—367 |
| 440,301 | 11/90 | Boorman et al. | 209—381 |
| 1,223,005 | 4/17 | Stoffel | 209—381 |
| 1,397,340 | 11/21 | Sturtevant | 209—89 |
| 1,814,552 | 7/31 | Heyman | 209—381 |
| 2,144,046 | 1/39 | Cundall. | |
| 2,153,243 | 4/39 | Flint | 209—329 |
| 2,188,798 | 1/40 | Smith | 22—89 |
| 2,238,116 | 4/41 | Kelly | 209—367 |
| 2,782,926 | 2/57 | Saxe | 209—239 |
| 2,854,714 | 10/58 | Dietert | 22—89 |
| 2,959,830 | 11/60 | Castera | 22—89 |
| 3,136,009 | 6/64 | Dietert et al. | 22—89 |
| 3,136,010 | 6/64 | Dietert et al. | 22—89 |

FOREIGN PATENTS 214,291    4/58    Australia.

HARRY B. THORNTON, *Primary Examiner.*

MAURICE BRINDISI, RICHARD WINDHAM,
*Examiners.*